United States Patent
Nishino et al.

(10) Patent No.: US 11,791,467 B2
(45) Date of Patent: Oct. 17, 2023

(54) NONAQUEOUS ELECTROLYTE SECONDARY BATTERY

(71) Applicant: Panasonic Intellectual Property Management Co., Ltd., Osaka (JP)

(72) Inventors: Hajime Nishino, Nara (JP); Satoko Motomatsu, Osaka (JP); Kazuhiro Yoshii, Osaka (JP); Takao Sato, Osaka (JP); Tomoki Shiozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 475 days.

(21) Appl. No.: 16/636,818

(22) PCT Filed: Jul. 5, 2018

(86) PCT No.: PCT/JP2018/025525
§ 371 (c)(1),
(2) Date: Feb. 5, 2020

(87) PCT Pub. No.: WO2019/044168
PCT Pub. Date: Mar. 7, 2019

(65) Prior Publication Data
US 2020/0373582 A1 Nov. 26, 2020

(30) Foreign Application Priority Data
Aug. 31, 2017 (JP) .................................. 2017-167583

(51) Int. Cl.
| | | |
|---|---|---|
| *H01M 4/62* | (2006.01) | |
| *H01M 4/36* | (2006.01) | |
| *H01M 4/66* | (2006.01) | |
| *H01M 10/0525* | (2010.01) | |
| *H01M 50/46* | (2021.01) | |
| *H01M 50/531* | (2021.01) | |
| *H01M 50/595* | (2021.01) | |
| *H01M 50/534* | (2021.01) | |
| *H01M 4/02* | (2006.01) | |

(52) U.S. Cl.
CPC .......... *H01M 4/626* (2013.01); *H01M 4/366* (2013.01); *H01M 4/662* (2013.01); *H01M 10/0525* (2013.01); *H01M 50/46* (2021.01); *H01M 50/531* (2021.01); *H01M 50/534* (2021.01); *H01M 50/595* (2021.01); *H01M 2004/027* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 8,592,076 | B2 * | 11/2013 | Sugita ................ | H01M 50/213 429/185 |
| 2002/0045094 | A1 * | 4/2002 | Yoshino .............. | H01M 4/139 429/324 |
| 2002/0197471 | A1 * | 12/2002 | Barnes ................. | C09J 7/243 428/343 |
| 2003/0175497 | A1 * | 9/2003 | Kobe .................... | C09J 7/26 428/317.9 |
| 2010/0221585 | A1 * | 9/2010 | Terashima ........... | H01M 4/06 428/343 |
| 2011/0159344 | A1 * | 6/2011 | Kobayashi ........... | H01M 4/366 429/130 |
| 2014/0120417 | A1 | 5/2014 | Matsushita et al. | |
| 2017/0309951 | A1 | 10/2017 | Ishikawa et al. | |

FOREIGN PATENT DOCUMENTS

| | | | |
|---|---|---|---|
| CN | 1316786 | A | 10/2001 |
| CN | 204625530 | U | 9/2015 |
| CN | 107641477 | * | 1/2018 |
| JP | 2006-73308 | A | 3/2006 |
| JP | 2007-103356 | A | 4/2007 |
| JP | 2011-034859 | * | 2/2011 |
| JP | 2014-89856 | A | 5/2014 |
| JP | 2017-130320 | A | 7/2017 |
| WO | 2016/121339 | A1 | 8/2016 |

OTHER PUBLICATIONS

Machine translation of JP 2011-034859, published on Feb. 17, 2011 (Year: 2011).*
Machine translation of CN 107641477, published on Jan. 30, 2018 (Year: 2018).*
International Search Report dated Aug. 21, 2018, issued in counterpart Application No. PCT/JP2018/025525 (2 pages).
English Translation of Chinese Search Report dated Aug. 3, 2022, issued in counterpart CN application No. 201880055691.1. (3 pages).

* cited by examiner

*Primary Examiner* — Anca Eoff
(74) *Attorney, Agent, or Firm* — WHDA, LLP

(57) ABSTRACT

A nonaqueous electrolyte secondary battery with a positive electrode having a positive electrode current collector and a positive electrode active material layer that is supported by a first main surface and a second main surface. The first main surface includes a first exposed section on which the positive electrode active material layer is not arranged. A positive electrode lead is connected to the first exposed section and includes an extension section and an overlapping section. At least a portion of the first exposed section, along with at least a portion of the overlapping section, is covered with a positive electrode insulating tape which has a base, a first layer that adheres to the first exposed section and to the overlapping section, and a second layer interposed between the base and the first layer; and the second layer expands when heated above a threshold.

9 Claims, 3 Drawing Sheets

NONAQUEOUS ELECTROLYTE SECONDARY BATTERY

TECHNICAL FIELD

The present invention relates to a nonaqueous electrolyte secondary battery that includes a positive electrode insulating tape that protects a positive electrode lead connected to a positive electrode.

BACKGROUND ART

In a nonaqueous electrolyte secondary battery, a positive electrode includes a positive electrode current collector and a positive electrode active material layer that is supported by the positive electrode current collector. In the positive electrode current collector, a first exposed section which does not include a positive electrode active material layer is formed, and one end portion of a positive electrode lead in the length direction is connected to the first exposed section. The other end portion of the positive electrode lead is connected to a positive electrode terminal of the battery. The positive electrode and the positive electrode terminal are electrically connected via the positive electrode lead. Because a large pressure is applied to components of an electrode assembly, in view of suppressing the occurrence of an internal short circuit, one end portion of the positive electrode lead is covered with a positive electrode insulating tape (PTL 1).

CITATION LIST

Patent Literature

PTL 1: International Publication No. 2016/121339

SUMMARY OF INVENTION

When a nonaqueous electrolyte secondary battery is externally short-circuited and generates heat, the heat may be concentrated on a positive electrode lead. When the positive electrode lead that has been heated comes in contact with a negative electrode, battery failure may occur.

One aspect of the present invention relates to a nonaqueous electrolyte secondary battery including a coiled electrode assembly and a nonaqueous electrolyte. In the nonaqueous electrolyte secondary battery, the coiled electrode assembly includes a positive electrode, a negative electrode, a separator interposed between the positive electrode and the negative electrode, a positive electrode lead electrically connected to the positive electrode, and a positive electrode insulating tape that covers a portion of the positive electrode, and the coiled electrode assembly is formed by coiling the positive electrode and the negative electrode with the separator interposed therebetween; the positive electrode includes a positive electrode current collector that includes a first main surface and a second main surface that is opposed to the first main surface and a positive electrode active material layer that is supported by the first main surface and the second main surface; the first main surface includes a first exposed section which faces the negative electrode and on which the positive electrode active material layer is not arranged; the positive electrode lead is connected to the first exposed section and includes an extension section that protrudes from the first exposed section and an overlapping section that overlaps the first exposed section; at least a portion of the first exposed section, along with at least a portion of the overlapping section, is covered with the positive electrode insulating tape; the positive electrode insulating tape includes a base, a first layer that adheres to the first exposed section and to the overlapping section, and a second layer interposed between the base and the first layer; and the second layer expands when heated above a threshold.

In the nonaqueous electrolyte secondary battery according to the present invention, conduction of the heat of the positive electrode lead to the negative electrode hardly occurs even when an external short circuit occurs, and, as a result, the occurrence of failure is suppressed.

DESCRIPTION OF EMBODIMENTS

[Nonaqueous Electrolyte Secondary Battery]

Figure 1:
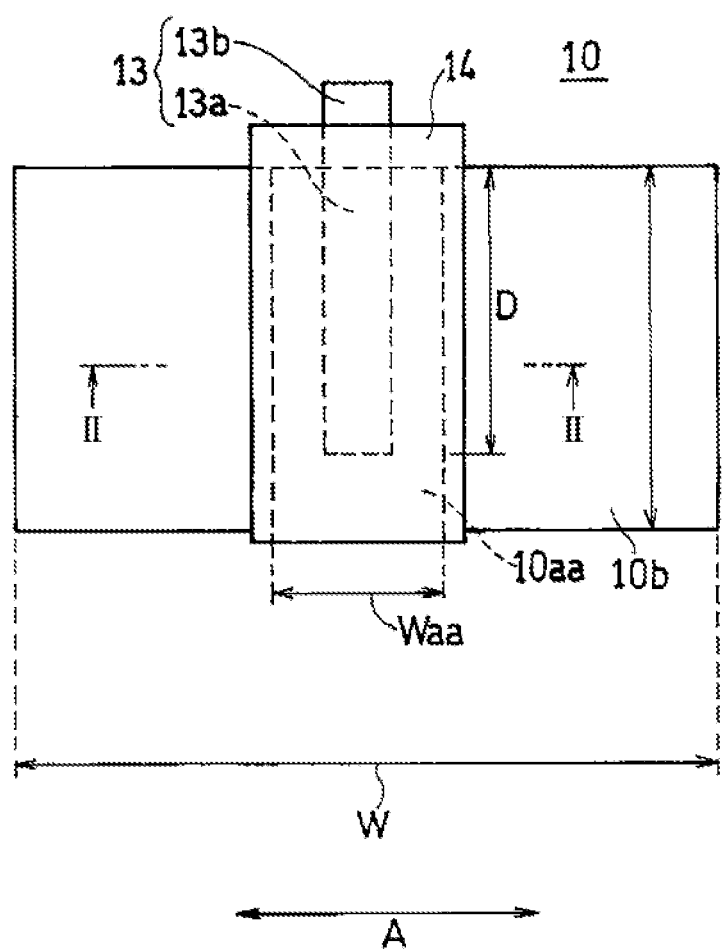
FIG. 1 is a plan view of the main part of a belt-shaped positive electrode used for a nonaqueous electrolyte secondary battery according to an embodiment of the present invention.

A nonaqueous electrolyte secondary battery according to an embodiment of the present invention (which hereafter may be simply referred to as a battery) includes a coiled electrode assembly and a nonaqueous electrolyte. The coiled electrode assembly includes a positive electrode, a negative electrode, a separator interposed between the positive electrode and the negative electrode, a positive electrode lead electrically connected to the positive electrode, and a positive electrode insulating tape that covers a portion of the positive electrode, and the coiled electrode assembly is formed by coiling the positive electrode and the negative electrode with the separator interposed therebetween. The positive electrode includes a positive electrode current collector that includes a first main surface and a second main surface that is opposed to the first main surface and a positive electrode active material layer that is supported by at least the first main surface. Furthermore, the first main surface includes a first exposed section which faces the negative electrode and on which the positive electrode active material layer is not arranged.

The positive electrode lead is connected to the first exposed section and includes an extension section that protrudes from the first exposed section and the overlapping section that overlaps the first exposed section. At least a portion of the first exposed section, along with at least a portion of the overlapping section, is covered with the positive electrode insulating tape. The positive electrode insulating tape includes a base, a first layer that adheres to the first exposed section and to the overlapping section, and a second layer interposed between the base and the first layer. The second layer expands when heated above a threshold.

In a nonaqueous electrolyte secondary battery such as a lithium ion secondary battery, for electricity to be drawn, a positive electrode lead is connected to a positive electrode of an electrode assembly, a negative electrode lead is connected to a negative electrode of the electrode assembly, and the positive electrode lead and the negative electrode lead are connected to a positive electrode terminal of the battery and a negative electrode terminal of the battery, respectively. The positive electrode lead, on which a positive electrode active material layer is not arranged, is connected to a first exposed section where a positive electrode current collector is exposed. A portion of the positive electrode lead that is connected to the first exposed section (an overlapping section) is covered with a positive electrode insulating tape. Accordingly, the occurrence of an internal short circuit is suppressed.

On the other hand, the battery may be externally short-circuited by accident. As a result, the battery may generate abnormal heat, and the heat may be concentrated on the positive electrode lead. When the positive electrode lead that has been heated comes in contact with the negative electrode, battery failure may occur.

In the present embodiment, a positive electrode insulating tape including a base, a first layer that adheres to a first exposed section and to an overlapping section, and a second layer interposed between the base and the first layer is used to cover at least a portion of the overlapping section of a positive electrode lead. The second layer expands when heated above a threshold. In other words, when the positive electrode lead is heated above a threshold due to, for example, an external short circuit, the second layer expands and, as a result, the thickness of the positive electrode insulating tape increases. Accordingly, the distance between the positive electrode lead and a negative electrode facing the first main surface where the positive electrode lead is disposed increases. As a result, conduction of the heat generated in the positive electrode lead to the negative electrode hardly occurs. Accordingly, the occurrence of battery failure is suppressed.

Figure 2:
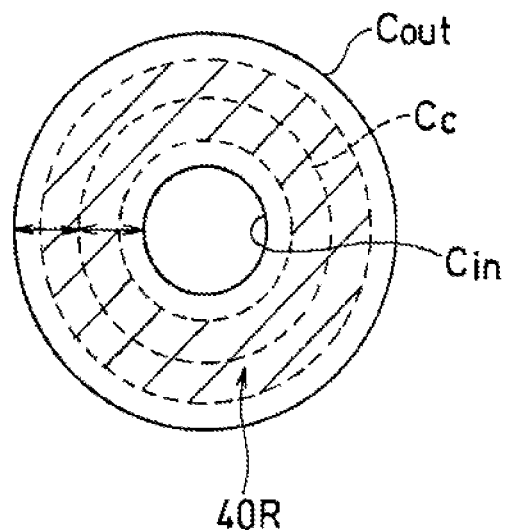
FIG. 2 is a sectional view of a coiled electrode assembly used for the nonaqueous electrolyte secondary battery according to an embodiment of the present invention.
Figure 3:
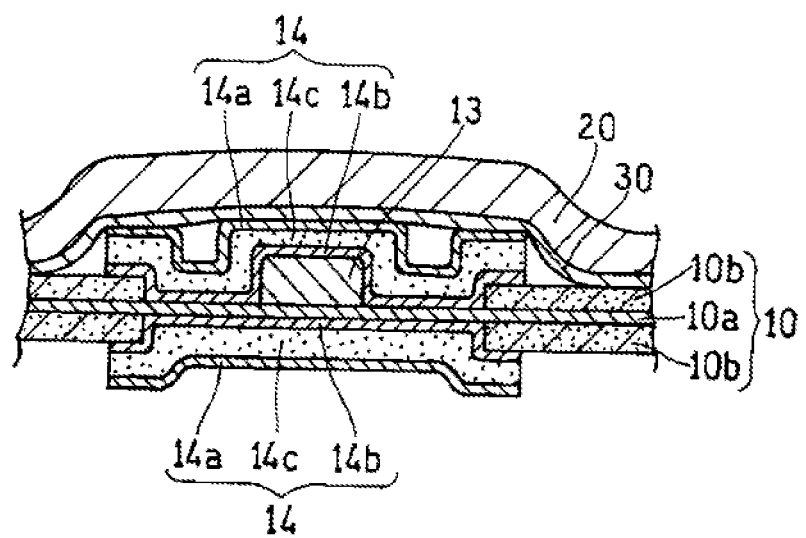
FIG. 3 is a sectional view of the positive electrode in FIG. 1 with a negative electrode placed on top thereof taken along line II-II as viewed in the direction of the arrows.

Hereafter, a nonaqueous electrolyte secondary battery according to an embodiment of the present invention will be described in detail by providing a lithium ion secondary battery as an example and with reference to the drawings where appropriate. FIG. 1 is a plan view of the main part of a belt-shaped positive electrode used for a nonaqueous electrolyte secondary battery according to an embodiment of the present invention. FIG. 2 is a sectional view of a coiled electrode assembly used for the nonaqueous electrolyte secondary battery according to the embodiment of the present invention. FIG. 3 is a sectional view of the positive electrode in FIG. 1 with a negative electrode placed on top thereof taken along line II-II as viewed in the direction of the arrows.

The nonaqueous electrolyte secondary battery is not particularly limited in form and may be a cylindrical battery, a square battery, or a flat-shaped battery. A battery case may be formed from a laminated film.

(Positive Electrode)

A positive electrode includes a positive electrode current collector and a positive electrode active material layer that is supported by the positive electrode current collector. The positive electrode current collector includes a first main surface and a second main surface that is opposed to the first main surface. The positive electrode active material layer is supported by the first main surface and the second main surface. However, on the first main surface, a first exposed section which faces a negative electrode and which does not include the positive electrode active material layer is formed. Furthermore, the second main surface may include a second exposed section which is disposed so as to correspond to the first exposed section and on which the positive electrode active material layer is not arranged. Accordingly, welding of a positive electrode lead and the positive electrode current collector may be facilitated. At least a portion of the second exposed section may be covered with a positive electrode insulating tape.

The form of the first exposed section is not particularly limited. When the positive electrode is belt-shaped, the first exposed section may be in the shape of a narrow slit that intersects the coil direction of the electrode assembly at an angle of 80 to 100 degrees. The width (length in the coil direction) of the slit-shaped first exposed section is, for example, 3 mm to 20 mm. The same applies to the second exposed section.

The positive electrode current collector may be a sheet-formed conductive material (e.g., metal foil). The metal forming the metal foil may be aluminum, an aluminum alloy, stainless steel, titanium, or a titanium alloy. The thickness of the positive electrode current collector may be, for example, 1 μm to 100 μm or 10 μm to 50 μm.

The positive electrode active material layer contains a positive electrode active material, a conductive agent, a binder, and the like. The positive electrode active material is a material capable of being doped and dedoped with lithium ions. The material may be, for example, a lithium complex oxide. The lithium complex oxide contains a transition metal of which the valence changes according to redox state. The transition metal may be vanadium, manganese, iron, cobalt, nickel, titanium, or the like. More specific examples of the lithium complex oxide include $LiCoO_2$, $LiMn_2O_4$, $LiNiO_2$, $LiNi_{x1}Mn_{y1}Co_{1-(x1+y1)}O_2$, $LiNi_{x2}Co_{y1}M_{1-(x2+y2)}O_2$, $\alpha LiFeO_2$, and $LiVO_2$. Herein, x1 and y1 are $0.25 \leq x1 \leq 0.6$ and $0.25 \leq y1 \leq 0.5$, respectively, and x2 and y2 are $0.75 \leq x2 \leq 0.99$ and $0.01 \leq y2 \leq 0.25$, respectively, and M is at least one element selected from the group consisting of Na, Mg, Sc, Y, Ti, V, Cr, Fe, Cu, Ag, Zn, Al, Ga, In, Sn, Pb, and Sb.

Carbon black, graphite, carbon fiber, or the like is used as the conductive agent to be contained in the positive electrode active material layer. The amount of the conductive agent is, for example, 0 to 20 parts by mass with respect to 100 parts by mass of the positive electrode active material. Fluorine resin such as polytetrafluoroethylene (PTFE) and polyvinylidene fluoride, acrylic resin, or rubber (rubber particles) such as styrene-butadiene rubber (SBR) is used as the binder to be contained in the positive electrode active material layer. The amount of the binder is, for example, 0.5 to 15 parts by mass with respect to 100 parts by mass of the positive electrode active material.

The positive electrode active material layer is formed by kneading a positive electrode mixture that contains a positive electrode active material, a binder, a conductive agent, and the like with a dispersion medium to prepare a positive electrode paste, applying the positive electrode paste to a predetermined region of the surface of the positive electrode current collector, and drying and rolling the positive electrode paste that has been applied. As the dispersion medium, an organic solvent, water, or the like is used. The organic solvent is not particularly limited, and an example thereof is N-methyl-2-pyrrolidone (NMP). The positive electrode paste may be applied using a coater of any kind. The drying after the application may be performed by air-drying or under a heated condition. The thickness of the positive electrode active material layer may be, for example, 50 μm to 200 μm or 60 μm to 150 μm.

The first exposed section is, for example, in the shape of a slit, where the positive electrode current collector is exposed from one end portion to the other end portion in the direction intersecting the coil direction (hereinafter referred to as a width direction). Such a first exposed section is, for example, formed by intermittently applying the positive electrode paste to the positive electrode current collector. The first exposed section may be formed by removing a portion of the positive electrode active material layer from the positive electrode.

A strip-shaped (rectangularly-sliced) positive electrode lead is electrically connected to the first exposed section, for example. At least a portion of the location of the positive electrode lead that overlaps the first exposed section (an overlapping section) is joined to the first exposed section by, for example, welding. Subsequently, both at least a portion of the first exposed section of the positive electrode current collector (preferably 50% or more of the area of the first exposed section) and at least a portion of the overlapping section of the positive electrode lead (preferably 90% or more of the area of the overlapping section) are covered with the positive electrode insulating tape.

Examples of materials used for the positive electrode lead include aluminum, aluminum alloys, nickel, nickel alloys, iron, and stainless steel. When the resistance of the positive electrode lead is larger than the resistance of the below-described negative electrode lead, the heat of the battery tends to be concentrated particularly on the positive electrode lead.

The thickness of the positive electrode lead may be, for example, 10 µm to 200 µm or 100 µm to 150 µm. The positive electrode lead may have a thickness smaller than that of the positive electrode active material layer or may have a thickness as large as or larger than that of the positive electrode active material layer. The size of the strip-shaped positive electrode lead is not particularly limited. The strip-shaped positive electrode lead has, for example, a width (length in the coil direction) of 2 mm to 8 mm and a length of 20 mm to 80 mm.

As illustrated in FIG. 1, a belt-shaped positive electrode 10 includes a positive electrode active material layer 10b on both surfaces of a positive electrode current collector 10a (see FIG. 3) except for a portion thereof. On one of the surfaces of the positive electrode current collector 10a, a slit-shaped first exposed section 10aa, where the positive electrode current collector 10a is exposed from one end portion to the other end portion in the width direction, is formed.

The width $W_{aa}$ of the first exposed section 10aa in the coil direction A of the positive electrode 10 is dependent on the size of the battery and is not particularly limited. The width $W_{aa}$ of the first exposed section 10aa is typically larger than the width of a positive electrode lead 13 and may be, for example, 3 mm to 20 mm or 5 mm to 16 mm. A portion of an overlapping section 13a of the strip-shaped positive electrode lead 13 is welded to the first exposed section 10aa. The length D of the overlapping section (the distance from the boundary between the overlapping section 13a and an extension section 13b to the position of the overlapping section 13a that is most distant from the boundary) is dependent on the size of the battery. The length D is, for example, 10 mm to 60 mm and may be 5% to 100% or 20% to 95% of the width L (length in the width direction) of the positive electrode current collector 10a.

The first exposed section 10aa may be formed on an end portion of the positive electrode current collector 10a in the coil direction A or may be on a region other than the end portion (e.g., at a position at a distance of 20% or more of the length between both end portions in the coil direction A).

With this structure, the resistance is decreased. In this case, the positive electrode lead 13 is interposed between negative electrodes, and the extension section 13b of the positive electrode lead 13 protrudes from an interior region of the coiled electrode assembly. In other words, the first exposed section 10aa may be positioned such that the extension section 13b of the positive electrode lead 13 protrudes from an interior region 40R.

As illustrated in FIG. 2, the interior region 40R of a coiled electrode assembly 40 is, in a cross sectional view perpendicular to the axial direction of the coiled electrode assembly 40, a region that combines a region extending in the direction of the outermost circumference $C_{out}$ from the center circle $C_c$ positioned in the middle of the innermost circumference $C_{in}$ and outermost circumference $C_{out}$ to 30% of the distance between the innermost circumference $C_{in}$ and the outermost circumference $C_{out}$ and a region extending in the direction of the innermost circumference $C_{in}$ from the center circle $C_c$ to 30% of the distance between the innermost circumference $C_{in}$ and the outermost circumference $C_{out}$. In FIG. 2, the interior region 40R is hatched for the sake of convenience.

A positive electrode insulating tape 14 covers the entire surface of the overlapping section 13a of the positive electrode lead 13 and the first exposed section 10aa around the overlapping section 13a. In view of suppressing the occurrence of an internal short circuit, an end portion of the extension section 13b, the end portion being adjacent to the overlapping section 13a, may also be covered with the positive electrode insulating tape 14, and the entire surface of the first exposed section 10aa may be covered. In this case, the positive electrode insulating tape 14 may cover a portion of the positive electrode active material layer 10b. Furthermore, the end portion of the extension section 13b is covered with the positive electrode insulating tape 14 from the side of the second main surface.

(Positive Electrode Insulating Tape)

As illustrated in FIG. 3, the positive electrode insulating tape 14 includes a base 14a, a first layer 14b, and a second layer 14c interposed therebetween. The first layer 14b is caused to adhere to the positive electrode lead 13 and to the first exposed section 10aa therearound. The second layer 14c, which is a middle layer, expands when heated above a threshold. With this structure, even when the second layer 14c expands, the adhesion between the first layer 14b, the positive electrode lead 13, and other components is maintained. Accordingly, the preventive effects on an internal short circuit are also maintained.

The base 14a may be formed of a resin in view of ease of availability and low cost. The resin is not particularly limited in kind as long as it has moderate elasticity, moderate flexibility, and moderate insulation properties. Examples of the resin include polyimide, polyamide (e.g., aromatic polyamide), polyamide-imide, polyolefin (e.g., polypropylene (PP)), polyester (e.g., polyethylene naphthalate), polyphenylsulfone (PPS), and polyphenylene sulfide. These resins may be used alone or in a combination of two or more.

In view of handleability and flexibility, the thickness of the base 14a may be 5 µm to 100 µm or 10 µm to 50 µm.

The first layer 14b contains an adhesive. Accordingly, the positive electrode insulating tape 14 can adhere to the positive electrode current collector 10a and to the positive electrode lead 13.

Various kinds of resin material may be used as the adhesive. Examples of the resin material include acrylic resin, natural rubber, synthetic rubber (e.g., butyl rubber), silicone, epoxy resin, melamine resin, and phenolic resin.

These may be used alone or in a combination of plural kinds. As needed, the adhesive may contain additives such as tackifiers, cross-linking agents, aging inhibitors, coloring agents, antioxidants, chain transfer agents, plasticizers, softeners, surfactants, and antistatic agents and tiny amounts of solvents.

In view of ease of obtaining high adhesiveness and ease of tape design, the thickness of the first layer may be 2 μm to 30 μm or 5 μm to 15 μm.

The second layer 14c is a layer that expands when heated above a threshold. The term threshold refers to a temperature that the battery in normal use can reach. The second layer 14c starts to expand when the battery generates abnormal heat due to, for example, an external short circuit and, as a result, the temperature of the second layer 14c exceeds the threshold. The threshold is appropriately set according to the performance of the battery and is, for example, about 110° C.

The second layer 14c contains, for example, a resin and a foaming filler. The foaming filler may be, for example, a compound containing crystallization water in a molecule (which hereafter may be referred to as a first filler) or a compound that decomposes and generates gas when heated (which hereafter may be referred to as a second filler). When the foaming filler is heated above the threshold, the first filler that has become anhydrous and/or the resin contained in the second layer 14c generates bubbles. Accordingly, the volume (thickness) of the second layer 14c increases and, consequently, the physical distance between the positive electrode lead 13 and a negative electrode 20 increases. At the same time, due to the bubbles, the thermal insulation properties of the second layer 14c improve. As a result, conduction of the heat of the positive electrode lead 13 to the negative electrode 20 is further suppressed.

Examples of the first filler include an alkali metal silicate. An alkali metal silicate contains abundant crystallization water in a molecule. Thus, the first filler and an alkali metal silicate that have become anhydrous start to release crystallization water when exposed to high temperature. At this time, bubbles are formed in the first filler that has become anhydrous and in the resin contained in the second layer 14c. Furthermore, due to latent heat generated when crystallization water is released, the electrode assembly may be cooled down.

Examples of the alkali metal include sodium, potassium, and lithium. Silicate salts of such alkali metals are incombustible materials having no ignition point or flash point and are suitable for being disposed in the interior of the battery. The alkali metal silicate may be used alone or in a combination of plural kinds. In view of the relatively low temperature at which crystallization water starts to be released, a sodium silicate salt may be used.

The mass ratio of the resin and the first filler is not particularly limited and may be appropriately set in consideration of, for example, the degree of increase in the thickness of the second layer 14c. For example, 1 to 50 parts by mass of the resin is mixed with respect to 100 parts by mass of the total amount of the resin and the filler. The thickness of the second layer 14c after expansion is, for example, 1.5 to 10 times the thickness before expansion.

Examples of the second filler include aluminum hydroxide, calcium hydroxide, magnesium hydroxide, alum, sodium sulfate, calcium carbonate, magnesium carbonate, barium carbonate, sodium hydrogen carbonate, ammonium dihydrogen phosphate, dinitropentamethylenetetramine, azodicarbonamide, oxybisbenzenesulfonyl hydrazide, hydrazodicarbonamide, and 5,5'-bis-H-tetrazole. These may be used alone or in a combination of plural kinds.

The mass ratio of the resin and the second filler is not particularly limited either. For example, 1 to 50 parts by mass of the resin is mixed with respect to 100 parts by mass of the total amount of the resin and the filler. The first filler and the second filler may be used in combination.

(Negative Electrode)

The negative electrode 20 includes a negative electrode current collector and a negative electrode active material layer that is supported by the negative electrode current collector. Typically, an exposed section that does not include the negative electrode active material layer is included in the negative electrode current collector as well. A strip-shaped negative electrode lead is connected to the exposed section, for example.

The negative electrode current collector may be, for example, a sheet-formed conductive material (e.g., metal foil). The metal forming the metal foil may be copper, a copper alloy, nickel, a nickel alloy, stainless steel, or the like. The thickness of the negative electrode current collector may be 1 μm to 100 μm or 2 μm to 50 μm.

Examples of the material for the negative electrode lead include copper and/or nickel and alloys thereof. When the positive electrode lead contains aluminum and the negative electrode lead contains copper, the heat of the battery tends to be concentrated particularly on the positive electrode lead which has larger resistance. However, because the positive electrode insulating tape 14 according to the present embodiment includes the second layer which expands with heat, conduction of the heat of the positive electrode lead 13 to the negative electrode is suppressed. In other words, the present embodiment is particularly effective when the positive electrode lead 13 has larger resistance than the negative electrode lead.

The negative electrode active material layer contains a negative electrode active material, a binder, and the like. The negative electrode active material is a material capable of being doped and dedoped with lithium ions, and any of carbon materials (e.g., various kinds of graphite such as natural graphite and artificial graphite, mesocarbon microbeads, and hard carbon), transition metal compounds capable of being doped and dedoped with lithium ions at a lower potential than the positive electrode, alloy materials, and the like may be used as the negative electrode active material. The alloy materials may be silicon, silicon compounds such as silicon oxide, silicon alloys, tin, tin oxide, tin alloys, or the like. These negative electrode active materials may be used alone or in a combination of two or more.

Fluorine resin, acrylic resin, rubber (rubber particles), cellulose resin (e.g., carboxymethyl cellulose (CMC)), or the like is used as the binder to be contained in the negative electrode active material layer. The amount of the binder is, for example, 0.5 to 15 parts by mass with respect to 100 parts by mass of the negative electrode active material.

The negative electrode active material layer is formed by kneading a negative electrode mixture that contains a negative electrode active material, a binder, and the like with a dispersion medium to prepare a negative electrode paste, applying the negative electrode paste to a predetermined region of the surface of the negative electrode current collector, and drying and rolling the negative electrode paste that has been applied. As the dispersion medium, as in the case of the positive electrode paste, an organic solvent, water, or the like is used. The negative electrode paste may be applied as in the case of the positive electrode. The thickness of the negative electrode active material layer may be, for example, 70 μm to 250 μm or 100 μm to 200 μm.

(Nonaqueous Electrolyte)

A nonaqueous electrolyte is prepared by dissolving a lithium salt in a nonaqueous solvent. Examples of the nonaqueous solvent include cyclic carbonates such as ethylene carbonate and propylene carbonate; linear carbonates such as dimethyl carbonate, diethyl carbonate, and ethyl methyl carbonate; lactones such as γ-butyrolactone; linear carboxylic acid esters such as methyl formate and methyl acetate; haloalkanes such as 1,2-dichloroethane; alkoxyalkanes such as 1,2-dimethoxyethane; ketones such as 4-methyl-2-pentanone; linear ethers such as pentafluoropropyl methyl ether; cyclic ethers such as 1,4-dioxane and tetrahydrofuran; nitriles such as acetonitrile; amides such as N,N-dimethylformamide; carbamates such as 3-methyl-2-oxazolidone; sulfur-containing compounds such as sulfoxides (e.g., sulfolane and dimethyl sulfoxide) and 1,3-propanesultone; and halogen substitution products in which hydrogen atoms of the foregoing solvents are substituted with halogen atoms such as fluorine atoms. The nonaqueous solvents may be used alone or in a combination of two or more.

Examples of the lithium salts for use include $LiPF_6$, $LiBF_4$, $LiAsF_6$, $LiSbF_6$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiClO_4$, $LiAlCl_4$, and $Li_2B_{10}Cl_{10}$. The lithium salts may be used alone or in a combination of two or more. The concentration of a lithium salt in the nonaqueous electrolyte may be, for example, 0.5 mol/L to 1.7 mol/L or 0.7 mol/L to 1.5 mol/L.

(Separator)

The separator for use may be a microporous resin film, a microporous resin film with a heat-resistant layer being applied to the surface thereof, nonwoven cloth, or the like. The resin for the microporous film may be a polyolefin material. Examples of the polyolefin material include polyethylene and polypropylene. The heat-resistant layer may contain, for example, heat-resistant resin or may contain heat-resistant resin and inorganic particles. The heat-resistant layer may be porous. Examples of the heat-resistant resin include aramid, polyimide, and polyamide-imide. The inorganic particles may be formed of alumina, titania, or the like.

The thickness of the separator is, for example, 5 μm to 50 μm.

Figure 4:
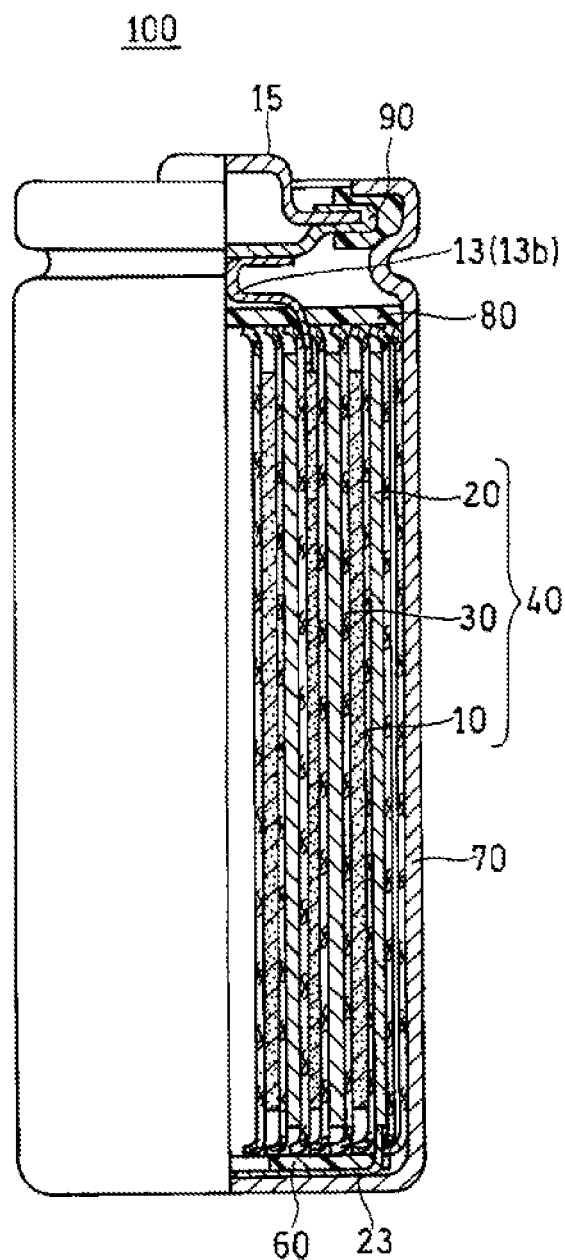
FIG. 4 is a schematic longitudinal sectional view of a cylindrical nonaqueous electrolyte secondary battery according to an embodiment of the present invention.

FIG. 4 is a longitudinal sectional view of an example of a cylindrical nonaqueous electrolyte secondary battery according to an embodiment of the present invention.

A nonaqueous electrolyte secondary battery 100 includes the coiled electrode assembly 40 and a nonaqueous electrolyte (not illustrated). The coiled electrode assembly 40 includes a belt-shaped positive electrode 10, a belt-shaped negative electrode 20, and a separator 30. A positive electrode lead 13 is connected to the positive electrode 10, and a negative electrode lead 23 is connected to the negative electrode 20. Regarding the positive electrode lead 13, only the extension section 13b is illustrated and the illustration of the overlapping section and the insulating tape are omitted.

One end portion of the positive electrode lead 13 in the length direction is connected to the first exposed section of the positive electrode 10 and the other end portion thereof is connected to a sealing plate 90. The sealing plate 90 includes a positive electrode terminal 15. One end portion of the negative electrode lead 23 is connected to the negative electrode 20 and the other end portion thereof is connected to the bottom of a battery case 70, the bottom serving as a negative electrode terminal. The battery case 70 is a closed-end cylindrical battery can. One end of the battery case in the length direction is open and the bottom of the other end serves as the negative electrode terminal. The battery case (the battery can) 70 is formed of a metal, such as iron. The inner surface of the battery case 70 formed of iron is typically plated with nickel. On top of and at the bottom of the coiled electrode assembly 40, an upper insulating ring 80 formed of a resin and a lower insulating ring 60 formed of a resin are respectively disposed.

INDUSTRIAL APPLICABILITY

In the nonaqueous electrolyte secondary battery according to the present invention, the occurrence of failure due to abnormal heat generation is suppressed. Accordingly, the nonaqueous electrolyte secondary battery according to the present invention is suitable for use as a driving source for electronic devices such as laptop computers and mobile phones and as a power source for power storage devices, electric vehicles, hybrid vehicles, electric tools, and the like that require high power.

REFERENCE SIGNS LIST

10: positive electrode
   10a: positive electrode current collector
      10aa: first exposed section
   10b: positive electrode active material layer
13: positive electrode lead
   13a: overlapping section
   13b: extension section
14: positive electrode insulating tape
   14a: base
   14b: first layer
   14c: second layer
15: positive electrode terminal
20: negative electrode
23: negative electrode lead
30: separator
40: coiled electrode assembly
   40R: interior region
60: lower insulating ring
70: battery case
80: upper insulating ring
90: sealing plate
100: nonaqueous electrolyte secondary battery
W: width of positive electrode
$W_{aa}$: width of first exposed section
D: length of overlapping section
L: length of positive electrode current collector
A: coil direction

The invention claimed is:

1. A nonaqueous electrolyte secondary battery comprising:
   a coiled electrode assembly and a nonaqueous electrolyte,
   wherein the coiled electrode assembly includes
   a positive electrode,
   a negative electrode,
   a separator interposed between the positive electrode and the negative electrode,
   a positive electrode lead electrically connected to the positive electrode, and
   a positive electrode insulating tape that covers a portion of the positive electrode, and the coiled electrode assembly is formed by coiling the positive electrode and the negative electrode with the separator interposed therebetween;

the positive electrode includes a positive electrode current collector that includes a first main surface and a second main surface that is opposed to the first main surface and a positive electrode active material layer that is supported by the first main surface and the second main surface;

the first main surface includes a first exposed section which faces the negative electrode and on which the positive electrode active material layer is not arranged;

the positive electrode lead is connected to the first exposed section and includes an extension section that protrudes from the first exposed section and an overlapping section that overlaps the first exposed section;

at least a portion of the first exposed section, along with at least a portion of the overlapping section, is covered with the positive electrode insulating tape;

the positive electrode insulating tape includes a base, a first layer that adheres to the first exposed section and to the overlapping section, and a second layer interposed between the base and the first layer; and the second layer expands when heated above a threshold, wherein the second layer includes a foaming filler that is in an unexpanded state and is configured to expand when heated above the threshold;

wherein the second main surface includes a second exposed section which is disposed so as to correspond to the first exposed section and on which the positive electrode active material layer is not arranged, and at least a portion of the second main surface is covered with the positive electrode insulating tape.

2. The nonaqueous electrolyte secondary battery according to claim 1, wherein the second layer contains a resin and the foaming filler.

3. The nonaqueous electrolyte secondary battery according to claim 1, wherein the foaming filler contains an alkali metal silicate.

4. The nonaqueous electrolyte secondary battery according to claim 1, wherein the foaming filler contains sodium silicate.

5. The nonaqueous electrolyte secondary battery according to claim 1, wherein the foaming filler contains at least one selected from the group consisting of aluminum hydroxide, calcium hydroxide, magnesium hydroxide, alum, sodium sulfate, calcium carbonate, magnesium carbonate, barium carbonate, sodium hydrogen carbonate, ammonium dihydrogen phosphate, dinitropentamethylenetetramine, azodicarbonamide, oxybisbenzenesulfonyl hydrazide, hydrazodicarbonamide, and 5,5'-bis-H-tetrazole.

6. The nonaqueous electrolyte secondary battery according to claim 1, wherein the extension section of the positive electrode lead protrudes from an interior region of the coiled electrode assembly.

7. The nonaqueous electrolyte secondary battery according to claim 1, further comprising:

a negative electrode lead electrically connected to the negative electrode, wherein the positive electrode lead contains aluminum and the negative electrode lead contains copper.

8. The nonaqueous electrolyte secondary battery according to claim 2, wherein 1 to 50 parts by mass of the resin is contained with respect to 100 parts by mass of a total amount of the resin and the filler in the second layer.

9. The nonaqueous electrolyte secondary battery according to claim 1, wherein a thickness of the second layer after expansion is 1.5 to 10 times a thickness before expansion.

* * * * *